No. 888,204. PATENTED MAY 19, 1908.
T. SUZUKI.
APPARATUS FOR BREWING SOY.
APPLICATION FILED DEC. 5, 1907.

Witnesses:
C. H. Crawford
E. Schallinger

Inventor,
Tozaburo Suzuki,
By B. Singer,
Atty.

UNITED STATES PATENT OFFICE.

TOZABURO SUZUKI, OF SUNAMURA, JAPAN.

APPARATUS FOR BREWING SOY.

No. 888,204.  Specification of Letters Patent.  Patented May 19, 1908.

Application filed December 5, 1907. Serial No. 405,291.

*To all whom it may concern:*

Be it known that I, TOZABURO SUZUKI, a subject of the Emperor of Japan, residing at No. 401 Jibeishinden, Sunamura, in the county of Minami-Katsushika, in the Province of Tokio, Japan, have invented a new and useful Improvement in Apparatus for Brewing Soy.

This invention relates to improvements in apparatus for brewing soy and has for its object the provision of means for quickly and uniformly controlling the temperature of the soy, for the purposes of effectually and accurately gaging fermentation and maturation, and means for obtaining circulation of the soy to uniformly bring the same under the influence of the temperature controlling means.

With these objects in view the invention in one exemplification will be more fully described in connection with the accompanying drawing and will be more particularly pointed out and ascertained in and by the appended claims.

Figure 1:
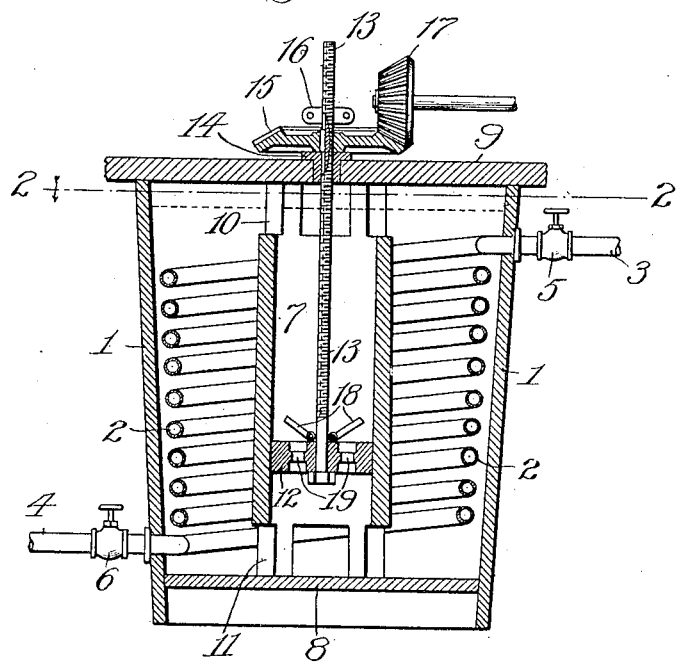
Figure 2:
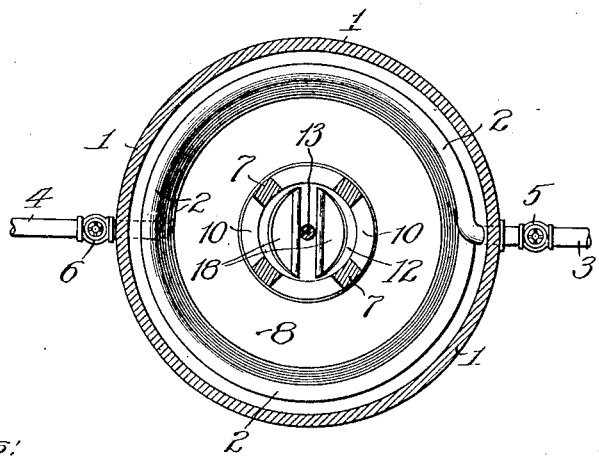

In the drawing:—Figure 1. is a vertical sectional view of an apparatus embodying the main features of my invention. Fig. 2. is a sectional view thereof taken on line 2—2 of Fig. 1.

Like numerals of reference designate similar parts throughout the different figures of the drawing.

As shown 1, designates a receptacle for the soy in which the same is treated in the operation of producing the final product. It is well known that during the process of making soy it is necessary to artificially change the temperature thereof to obtain fermentation and maturation at the proper time, and therefore means are provided for performing this function and as shown said means is disposed within the receptacle 1 and consists of a coil of pipe 2, having an inlet and outlet 3 and 4, respectively, adapted to be connected with a source of supply and an outlet discharge for a cooling and heating medium. Advisedly the outlets 3 and 4 are provided with valves 5 and 6 respectively, for controlling the passage of the cooling or heating medium through said coil.

In cold weather hot water or other suitable heating medium is passed through the coil until the first fermentation has been completed and in hot weather cold water or other suitable medium is used during maturing but inasmuch as the invention does not relate to the process of brewing soy the detail steps will not be specifically detailed.

In order to uniformly and quickly change the temperature of the soy, during the process of brewing, it is desirable to agitate the contents of the receptacle in a manner to uniformly bring the same under the influence of or in contact with the coil 2 as otherwise the coil would heat only that portion of the soy adjacent it and would permit the remaining portions to remain at a different temperature. The method of agitating the soy according to the present invention consists in bodily moving the same, and preferably such movement of the soy is effected through a prescribed circuit or course and in one direction, therefore means is associated with the receptacle for providing a passage for the soy and said means conveniently constitutes with said receptacle, an endless circuit or course through which the soy may be passed, said circuit being closed to the exterior of the receptacle. The means for regulating the temperature of the soy is located within the course or circuit through which the soy is passed.

In the most improved embodiment of the invention the passage of the soy is located within the receptacle 1 and consists of a cylinder 7 which is conveniently centrally disposed within the receptacle 1 and extends from the lower wall 8 to the cover 9 of said receptacle. The cover 9, is removed when the receptacle is filled or emptied but is normally in the position shown for closing the receptacle. Throughout the greater portion of its length the cylinder 7 is imperforate and at its upper and lower extreme end openings 10 and 11 are provided which afford communication between the cylinder 7 and the receptacle 1. It will thus be seen from the foregoing description and by reference to the arrows indicated by Fig. 1 that an endless course or circuit is provided for the soy and that the same, if forced to travel in a single direction, will pass upwardly in the cylinder 7 through the openings 10 and downwardly in the receptacle 1 through the openings 11 to the cylinder 7 where its upward course is again resumed. It has been found in practice that the best results have been obtained where the receptacle 1 is filled with soy to a level intersecting the openings 10 mid-way of their length as indicated by the dotted line in Fig. 1.

Mechanism is provided for effecting the required movement of the soy within the receptacle 1 and preferably said mechanism is located within the means or cylinder 7 and operates therein in the performance of its function. In the present embodiment shown reciprocating mechanism is provided for effecting movement of the soy and said mechanism is in the form of a piston 12 provided with a piston rod 13 adapted to project through wall 9. Said piston 12 fits the cylinder 7 in such a manner as to permit free movement of the piston and prevent passage of the soy from one side to the other of the piston at points between the piston and the cylinder 7.

The mechanism referred to includes broadly any suitable means for reciprocating the piston 6 and one convenient arrangement may consist in threading the piston rod 13 and providing an internally threaded collar 14 in the upper wall 9 through which the piston rod 13 may pass. A bevel gear 15 is splined on the piston rod 13 and is mounted between the collar 14 and a suitable bearing 16. A reversely driven bevel gear 17 meshes with the gears 15 and may be operated from any desirable or convenient source of power.

If the mechanism described is reciprocated the course of the soy will be in reverse directions through the path indicated by arrows but in practice it has been found that the best results are obtained by forcing the soy through its course in one direction and to this end devices are provided, preferably associated with said piston, whereby upon reciprocation of the latter in one direction the soy is moved through its course and whereby upon movement of the piston in an opposite direction no movement of the soy is effected.

In the specific embodiment shown the piston 12 is provided with valve closures 18 which are hinged to the piston 12 and are adapted to coöperate with openings 19 in the piston to close and open the same in a manner to perform the functions just described. It will thus be seen by reference to Fig. 1 that when the piston 12 is reciprocated upwardly the valves 18 will be closed by the weight of the soy and the latter will be forced upwardly in the cylinder 7 through openings 10 and downwardly in the receptacle in the direction indicated by the arrows. On its downward movement the valves of the piston 12 will open and the soy will pass through the piston and therefore no bodily movement of the contents of the receptacle will be effected. It will be seen that by providing the piston with valves as shown the soy is intermittently moved in the circuit and thus adjacent the pipes 2, will remain in a position of rest during downward travel of the piston 12, thereby permitting the pipes 2 to act effectively in changing the temperature of the soy.

I claim:—

1. An apparatus for brewing soy comprising in combination, a receptacle for the soy, means for changing the temperature of the soy means associated with said receptacle for providing a passage for the soy, said means forming with said receptacle an endless circuit for the soy, and reciprocating mechanism provided with devices whereby the soy is forced through the circuit in one direction.

2. An apparatus for brewing soy comprising in combination, a receptacle for the soy, means for changing the temperature of the soy means associated with said receptacle for providing a passage for the soy, said means forming with said receptacle an endless circuit for the soy, and reciprocating mechanism provided with valves whereby the soy may be forced through said circuit in one direction.

3. An apparatus for brewing soy comprising in combination a receptacle for the soy, a cylinder forming a passage for the soy and provided with openings whereby said cylinder forms with said receptacle an endless circuit for the soy, a piston located in said cylinder, valves for said piston, and a coil located in said receptacle whereby the temperature of the soy may be controlled.

4. An apparatus for brewing soy comprising in combination, a normally closed receptacle for the soy, a cylinder in said receptacle forming a passage for the soy and provided with openings at its upper and lower end communicating with said receptacle, said cylinder and receptacle thereby forming an endless path or circuit for the soy closed to the exterior of said receptacle, a piston fitting said cylinder closely, valves for said piston opening upwardly by engagement with the soy when the piston travels downwardly and permitting the soy to pass through said piston and remain in a state of rest, said valves closing downwardly by engagement with the soy when the piston travels upwardly, to prevent passage of the soy through the piston and thereby effect movement of the soy, means for slowly reciprocating the piston to cause intermittent movement of the soy through said circuit, and means disposed in said circuit and in the path of the soy for changing the temperature thereof.

5. An apparatus for brewing soy comprising in combination, a closed receptacle for the soy, means for changing the temperature of the soy, means disposed within said receptacle and forming therewith an endless circuit for the soy, and reciprocating mechanism for slowly forcing the soy through said circuit.

6. An apparatus for brewing soy comprising in combination, a closed receptacle for the soy, means for changing the temperature of the soy, means disposed within said receptacle and forming therewith an endless circuit for the soy, and reciprocating mechanism for slowly forcing the soy through said circuit in one direction.

7. An apparatus for brewing soy comprising in combination, a closed receptacle for the soy, means located in said receptacle and forming therewith separate and independent passages communicating with each other and forming an endless circuit for the soy, means disposed in the path of the soy for changing the temperature thereof, and continuously driven means forcing the soy through said circuit in one direction and permitting the soy to remain stationary to enable said temperature changing means to act thereon.

8. An apparatus for brewing soy comprising in combination, a closed receptacle for the soy, means located in said receptacle and forming therewith separate and independent passages communicating with each other and forming an endless circuit for the soy, means disposed in the path of the soy for changing the temperature thereof, and continuously driven means forcing the soy slowly through said circuit, said means permitting the soy to remain stationary during periods of its operation whereby said temperature changing means may act thereon.

In testimony whereof I affix my signature in presence of two witnesses.

TOZABURO SUZUKI.

Witnesses:
    YASUNOSUKE FUKUKITA,
    JAMES B. DAVIES.